United States Patent
Pan et al.

(10) Patent No.: US 9,906,973 B2
(45) Date of Patent: Feb. 27, 2018

(54) EVOLVED NODEB AND TRAFFIC DISPATCH METHOD THEREOF

(71) Applicant: INDUSTRIAL TECHNOLOGY RESEARCH INSTITUTE, Hsinchu (TW)

(72) Inventors: Meng-Shiuan Pan, New Taipei (TW); Tzu-Ming Lin, Zhubei (TW); Chun-Yuan Chiu, Pingtung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 127 days.

(21) Appl. No.: 14/556,013

(22) Filed: Nov. 28, 2014

(65) Prior Publication Data

US 2016/0157117 A1    Jun. 2, 2016

(51) Int. Cl.
*H04W 24/10* (2009.01)
*H04W 28/08* (2009.01)

(52) U.S. Cl.
CPC ........... *H04W 24/10* (2013.01); *H04W 28/08* (2013.01)

(58) Field of Classification Search
CPC ... H04W 24/10; H04W 28/08; H04W 28/085; H04W 28/0252; H04W 28/0257; H04W 28/0263; H04W 40/22; H04W 28/02; H04W 72/1263; H04W 72/1268; H04W 72/1273; H04W 72/1226; H04W 40/12; H04W 72/08; H04W 72/085; H04W 72/12; H04W 72/1231; H04W 76/021; H04W 76/025; H04W 28/0278; H04W 72/1205
See application file for complete search history.

(56) References Cited

U.S. PATENT DOCUMENTS

| 7,417,963 B2 | 8/2008 | Chen et al. |
| 8,000,286 B1 | 8/2011 | Barbee et al. |
| 8,265,010 B2 | 9/2012 | Hsu et al. |

(Continued)

FOREIGN PATENT DOCUMENTS

| CN | 102625388 B | 9/2014 |
| WO | WO 2014/008039 A1 | 1/2014 |

OTHER PUBLICATIONS

Ashraf et al., "SLEEP Mode Techniques for Small Cell Deployments", IEEE Communications Magazine, Aug. 2011, pp. 72-79.

(Continued)

*Primary Examiner* — Charles C Jiang
*Assistant Examiner* — Rose Clark
(74) *Attorney, Agent, or Firm* — Birch, Stewart, Kolasch & Birch, LLP

(57) ABSTRACT

A traffic dispatch method of a first eNB comprises the following steps: generating an estimation result according to measurement reports of a plurality of user equipments (UEs), wherein parts of the measurement reports are provided by a second eNB connected to the first eNB through a backhaul connection and parts of the measurement reports are provided by parts of the UEs, wherein coverage area of the second eNB is encompassed by the first eNB; receiving a status report from the second eNB; and making a traffic split decision according to the estimation result and the status report of the second eNB to dispatch traffic to the second eNB through the backhaul connection.

30 Claims, 8 Drawing Sheets

(56) References Cited

U.S. PATENT DOCUMENTS

| | | |
|---|---|---|
| 8,351,920 B2 | 1/2013 | Gallagher |
| 8,364,161 B2 | 1/2013 | Nitta et al. |
| 8,417,237 B2 | 4/2013 | Behairy et al. |
| 8,432,871 B1 | 4/2013 | Sarnaik et al. |
| 8,437,748 B2 | 5/2013 | Brisebois et al. |
| 8,462,695 B2 | 6/2013 | Oyman et al. |
| 8,504,055 B2 | 8/2013 | Vikberg et al. |
| 8,520,612 B2 | 8/2013 | Yamamoto et al. |
| 8,537,731 B2 | 9/2013 | Immendorf et al. |
| 8,538,342 B2 | 9/2013 | Morita et al. |
| 8,543,120 B2 | 9/2013 | Mizusawa |
| 8,548,468 B2 | 10/2013 | Jin et al. |
| 8,588,762 B2 | 11/2013 | Zhao et al. |
| 2009/0180428 A1 | 7/2009 | Viswanath |
| 2009/0238114 A1 | 9/2009 | Deshpande et al. |
| 2009/0247166 A1 | 10/2009 | Luo et al. |
| 2009/0285159 A1 | 11/2009 | Rezaiifar et al. |
| 2010/0080163 A1 | 4/2010 | Krishnamoorthi et al. |
| 2010/0103857 A1 | 4/2010 | Ulupinar et al. |
| 2010/0103861 A1 | 4/2010 | Ulupinar et al. |
| 2010/0208654 A1 | 8/2010 | Sampath et al. |
| 2010/0210267 A1 | 8/2010 | Bae et al. |
| 2010/0214977 A1 | 8/2010 | Hegde |
| 2010/0260097 A1 | 10/2010 | Ulupinar et al. |
| 2010/0309876 A1 | 12/2010 | Khandekar et al. |
| 2011/0110296 A1 | 5/2011 | Malladi et al. |
| 2011/0134832 A1 | 6/2011 | Soliman |
| 2011/0280185 A1 | 11/2011 | Wu et al. |
| 2011/0286426 A1 | 11/2011 | Kalhan |
| 2011/0310802 A1 | 12/2011 | Song et al. |
| 2011/0317624 A1 | 12/2011 | Luo et al. |
| 2012/0099568 A1 | 4/2012 | Wentink |
| 2012/0106442 A1 | 5/2012 | Xiao |
| 2012/0173901 A1 | 7/2012 | Soliman et al. |
| 2012/0182967 A1 | 7/2012 | Sato |
| 2012/0201203 A1 | 8/2012 | Miyagawa et al. |
| 2012/0207093 A1 | 8/2012 | Li |
| 2012/0230282 A1 | 9/2012 | Wu et al. |
| 2012/0236801 A1 | 9/2012 | Krishnaswamy et al. |
| 2012/0243477 A1 | 9/2012 | Shinada et al. |
| 2012/0302241 A1 | 11/2012 | Klingenbrunn et al. |
| 2012/0302244 A1 | 11/2012 | Sridhar et al. |
| 2013/0059588 A1 | 3/2013 | Jo et al. |
| 2013/0064103 A1 | 3/2013 | Koskela et al. |
| 2013/0072199 A1 | 3/2013 | Miyagawa et al. |
| 2013/0088960 A1 | 4/2013 | Bi et al. |
| 2013/0094371 A1 | 4/2013 | Vallath et al. |
| 2013/0100893 A1 | 4/2013 | Sawai |
| 2013/0143542 A1 | 6/2013 | Kovvali et al. |
| 2013/0156006 A1 | 6/2013 | Bosch et al. |
| 2013/0176988 A1 | 7/2013 | Wang et al. |
| 2013/0195012 A1 | 8/2013 | Laitila et al. |
| 2013/0225170 A1 | 8/2013 | Edge et al. |
| 2013/0250764 A1 | 9/2013 | Vasudevan et al. |
| 2013/0265974 A1 | 10/2013 | Van Phan et al. |
| 2013/0272170 A1* | 10/2013 | Chatterjee ............ H04W 28/02 370/280 |
| 2013/0279419 A1 | 10/2013 | Li et al. |
| 2013/0310041 A1 | 11/2013 | Deng et al. |
| 2014/0204771 A1 | 7/2014 | Gao et al. |
| 2014/0247743 A1 | 9/2014 | Seo |
| 2015/0045032 A1* | 2/2015 | Tomici .................. H04W 36/04 455/436 |
| 2015/0050940 A1* | 2/2015 | Cai ...................... H04W 72/082 455/452.2 |
| 2015/0063151 A1* | 3/2015 | Sadek .................. H04W 24/08 370/252 |
| 2015/0189551 A1* | 7/2015 | Ozturk .................. H04W 28/08 370/235 |
| 2015/0208366 A1* | 7/2015 | Papasakellariou .. H04W 52/244 370/311 |
| 2015/0223149 A1* | 8/2015 | Liu ....................... H04W 48/12 370/252 |
| 2015/0271836 A1* | 9/2015 | Damnjanovic ... H04W 72/0413 370/329 |
| 2015/0334737 A1* | 11/2015 | Susitaival ......... H04W 72/1284 370/329 |
| 2015/0351139 A1* | 12/2015 | Zhang ............... H04W 52/0251 370/329 |
| 2015/0365984 A1* | 12/2015 | Lee ....................... H04W 76/02 370/329 |
| 2016/0037511 A1* | 2/2016 | Vincze ................... H04B 7/024 370/329 |
| 2016/0057658 A1* | 2/2016 | Horn ....................... H04L 43/16 370/236 |
| 2016/0164793 A1* | 6/2016 | Basu Mallick ....... H04W 28/06 370/235 |
| 2016/0183158 A1* | 6/2016 | Decarreau ............. H04W 36/02 370/328 |
| 2016/0192269 A1* | 6/2016 | Kim ...................... H04W 36/30 370/332 |
| 2016/0242235 A1* | 8/2016 | Vasudevan .......... H04W 76/026 |
| 2016/0295613 A1* | 10/2016 | Wager ................. H04L 41/0813 |
| 2017/0034866 A1* | 2/2017 | Wager ................. H04W 76/025 |

OTHER PUBLICATIONS

Domenico et al., "Dynamic Traffic Management for Green Open Access Femtocell Networks", IEEE, 2012, 6 pages.

Huawei, HiSilicon, "Performance evalution of user throughput enhancement with Multi-Stream Aggregation over non-ideal backhaul", R2-132833, 3GPP TSG-RAN WG2 Meeting #83, Barcelona, Spain, Aug. 19-23, 2013.

Intel Corporation, "Throughput evaluation and comparison of with and without UP bearer split", R2-132859, 3GPP TSG RAN WG2 Meeting #83, Barcelona, Spain, Aug. 19-23, 2013.

NSN, Nokia Corporation, "Performance of bearer split with non-ideal backhaul", R2-132897, 3GPP TSG-RAN WG2 Meeting #83, Barcelona, Spain, Aug. 19-23, 2013.

Piro et al., "QoS provisioning in LTE-A networks with relay nodes", IEEE, 2012, 3 pages.

Piro et al., "Two-Level Downlink Scheduling for Real-Time Multimedia Services in LTE Networks", IEEE Transactions on Multimedia, Oct. 2011, vol. 13, No. 5, pp. 1052-1065.

Sadiq et al., "Downlink Scheduling for Multiclass Traffic in LTE", Research Article, Hindawi Publishing Corporation, EURASIP Journal on Wireless Communications and Networking, vol. 2009, Article ID 510617, 18 pages, doi: 10.1155/2009/510617.

\* cited by examiner

EVOLVED NODEB AND TRAFFIC DISPATCH METHOD THEREOF

TECHNICAL FIELD

The disclosure relates in general to communication devices and operating method thereof, and to an evolved NodeB and traffic dispatch method thereof.

BACKGROUND

Long Term Evolution-Advanced (LTE-A) is a developing standard which is considered to be able to support high speed data service for fourth generation (4G) mobile networks. According to the requirement of 4G, the LTE-A network could support the downlink and uplink data rates up to 1 Gbps and 500 Mbps, respectively. In a LTE-A network, each user equipment (UE) connects to an evolved NodeB (eNB), which provides user plane and control plane services, as its base station.

It could be foreseen that there will have more and more mobile applications in the future, and the demand on bandwidth will grow greatly. However, when traffic load of a LTE-A network becomes heavy, the network may not be able to provide good quality of experience (QoE) for UEs.

SUMMARY

The disclosure is directed to eNBs and traffic dispatch methods thereof. A scheme to dispatch data between a first eNB and a second eNB is proposed. The proposed scheme may offload traffics of the first eNB.

An embodiment in accordance with the disclosure, an eNB in a network is provided. The eNB is a first eNB which connected to a second eNB through a backhaul connection and coverage area of the second eNB is encompassed by the first eNB. The first eNB comprises a predict module and a split decision module. The predict module outputs an estimation result according to measurement reports of a plurality of user equipments (UEs), wherein parts of the measurement reports are provided by the second eNB and parts of the measurement reports are provided by parts of the UEs. The split decision module makes a traffic split decision according to the estimation result and a status report of the second eNB to dispatch traffic to the second eNB through the backhaul connection.

An exemplary embodiment in accordance with the disclosure, a traffic dispatch method of a first eNB in a network is provided. The method comprises the following steps. Generating an estimation result according to measurement reports of a plurality of user equipments (UEs), wherein parts of the measurement reports are provided by a second eNB connected to the first eNB through a backhaul connection and parts of the measurement reports are provided by parts of the UEs, wherein coverage area of the second eNB is encompassed by the first eNB; receiving a status report from the second eNB; and making a traffic split decision according to the estimation result and the status report of the second eNB to dispatch traffic to the second eNB through the backhaul connection.

An exemplary embodiment in accordance with the disclosure, an s eNB in a network is provided. The eNB is a second eNB which connected to a first eNB through a backhaul connection and serves a plurality of user equipments (UEs), wherein coverage area of the second eNB is encompassed by the first eNB. The second eNB comprises a status report module for outputting a status report of the second eNB to the first eNB, so that the first eNB makes a traffic split decision according to the status report of the second eNB.

Figure 1:
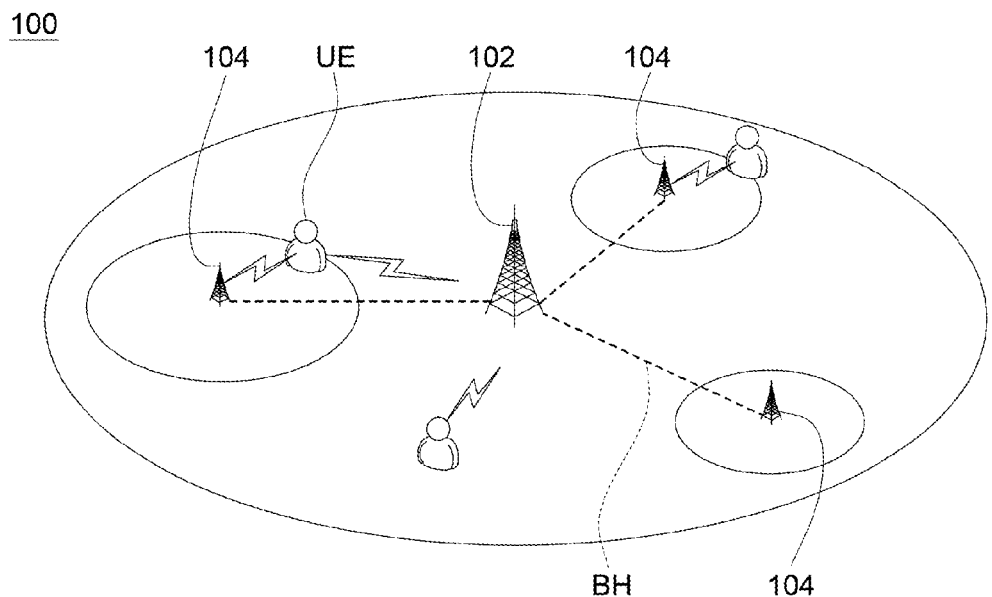
FIG. 1 is a schematic diagram illustrating a network according to an exemplary embodiment of the present disclosure.

In the following detailed description, for purposes of explanation, numerous specific details are set forth in order to provide a thorough understanding of the disclosed exemplary embodiments. It will be apparent, however, that one or more exemplary embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a schematic diagram illustrating a network 100 according to an exemplary embodiment of the present disclosure. The network 100 comprises a first evolved NodeB (eNB) 102 and second eNBs 104. For a second eNB 104, the first eNB 102 is connected to the second eNBs 104 through a backhaul connection BH and coverage area of the second eNB 104 is encompassed by the first eNB 102. As shown in FIG. 1, the first eNB 102 has a coverage area larger than those of the second eNBs 104 and is connected to the second eNBs 104 through backhaul connections BH. The second eNBs 104 play the role of a base station and may serve user equipments (UEs) that are located in their coverage areas.

In the embodiment, the first eNB 102 is a macro eNB and the second eNB 104 is a small cell eNB, but the present disclosure is not limited thereto. For example, the second eNB 104 may also be a slave eNB, a micro cell, a pico cell, a femto cell, or a relay node etc. Moreover, it is understood that the quantities of the first eNB, second eNB and UEs shown in FIG. 1 and disposition of these devices are for description purpose only, not for limiting the disclosure, and may be adjusted to fit actual needs.

Since a UE is connect to a first eNB 102 or second eNB 104 for data and control service, in the small cell scenario, the network 100 may configure the connection of a UE by the following three types:

1) The UE only connects to the first eNB 102 (say type tM).
2) The UE connects to both first eNB 102 and a second eNB 104 (say type tMS).
3) The UE only connects to a second eNB 104 (say type tS).

A UE may be configured as type tMS if the UE has the capability of dual connectivity. According to the LTE-A specification, when a UE has the dual connectivity capability, it may have split bearers, i.e., parts of its bearers' contents are sent through first eNB 102 and the others are sent through a second eNB 104. In other words, a type tMS UE may receive data from the first eNB 102 and one of the second eNBs 104 at the same time. In the one hand, a type tMS UE may enjoy higher data rates than those type tM and type tS UEs when the network load is not heavy. On the other hand, the existence of type tMS UEs may also help to offload the traffic on the first eNB 102 by relaying some traffic flows to second eNBs 104. Accordingly, by separating tMS UEs' traffics to the second eNBs 104 appropriately, the network 100 throughput may be maximized.

According to an exemplary embodiment of the present disclosure, a data dispatch scheme which contains two phases is provided. The first phase is the periodical traffic dispatch phase. The second phase is the real-time traffic processing phase. The first eNB 102 may dispatch traffic to the second eNB 104 in the periodical traffic dispatch phase or in the real-time traffic processing phase. In an embodiment, when the conditions of the network 100 are stable, the network 100 may obtain an optimal throughput based on the traffic dispatch decision in the periodical traffic dispatch phase. On the other hand, when the conditions of the network 100 are dynamic, the second eNB 104 may request more data from the first eNB 102 or to slow down the split bearers' data rates in the real-time traffic processing phase. Details of the two phases are respectively disclosed below.

Periodical Traffic Dispatch Phase

Figure 2A:
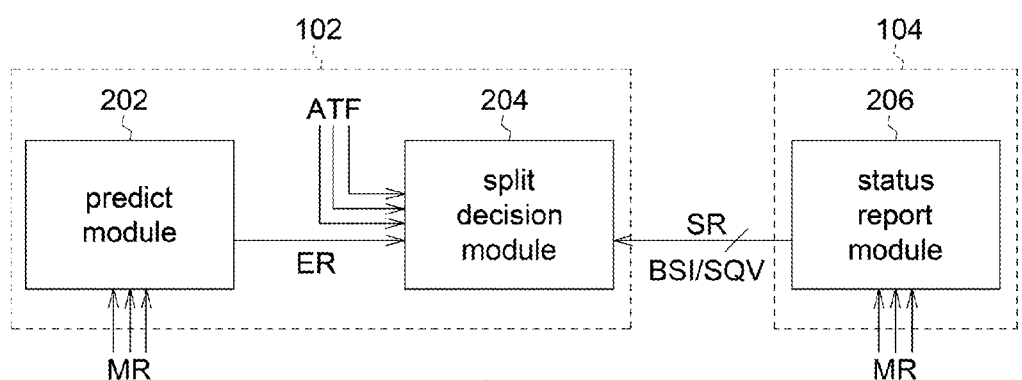
FIG. 2A is a block diagram illustrating modules in a first eNB and a second eNB shown in FIG. 1 according to an exemplary embodiment of the present disclosure.
Figure 2B:
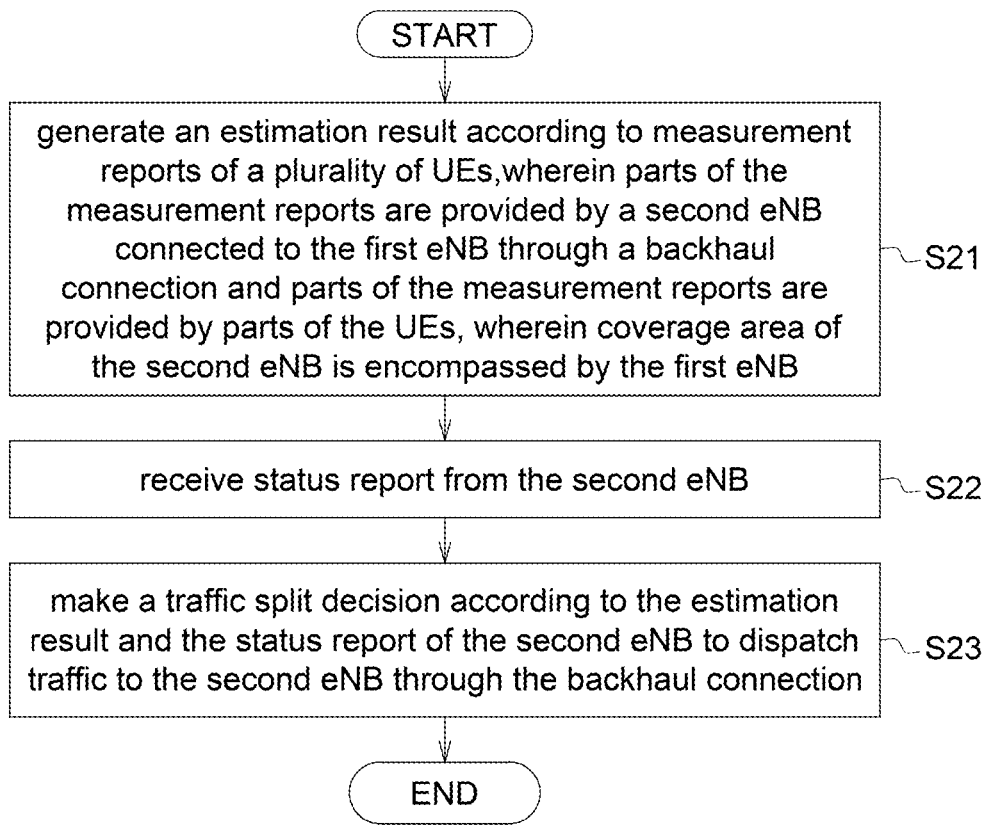
FIG. 2B is a flow chart of a traffic dispatch method of the first eNB 102 according to an exemplary embodiment of the present disclosure.

Referring to FIG. 2A and FIG. 2B, FIG. 2A is a block diagram illustrating modules in the first eNB 102 and a second eNB 104 shown in FIG. 1 according to an exemplary embodiment of the present disclosure, and FIG. 2B is a flow chart of a traffic dispatch method of the first eNB 102 according to an exemplary embodiment of the present disclosure. The first eNB 102 comprises a predict module 202 and a split decision module 204. The second eNB 104 comprises a status report module 206. For a 3GPP/LTE scenario, the predict module 202, the split decision module 204 and the status report module 206 may be realized in, but not limited to, the Radio Resource Control (RRC) layer, the Packet Data Convergence Protocol (PDCP) layer and the Radio Link Control (RLC) layer, respectively to perform their functionalities.

At step S21, the first eNB 102 generates an estimation result ER according to measurement reports MR of a plurality of UEs. Specifically, the predict module 202 of the first eNB 102 may output an estimation result ER according to measurement reports MR of the UEs. In an embodiment, the predict module 202 utilizes the periodical measurement reports MR from the UEs to determine the UEs' air downlink data rates in the upcoming time interval to generate the estimation result ER. In the embodiment, parts of the measurement reports are provided by the second eNB 104 and parts of the measurement reports are provided by parts of the UEs.

At step S22, the first eNB 102 receives status report SR from the second eNB 104. In one embodiment, the status report module 206 may output status reports SR of the second eNB 104 to the first eNB 102, so that the first eNB 102 makes a traffic split decision according to the status report SR of the second eNB 104. In other embodiment, the status report module 206 reports buffer status information BSI and signal quality values SQV of tMS and tS UEs in the second eNB 104 to the first eNB 102 to facilitate traffic decision making. In some embodiments, the buffer status information BSI indicates data associated with at least one of the UEs served by the second eNB 104 remaining in the second eNB 104.

Figure 2C:
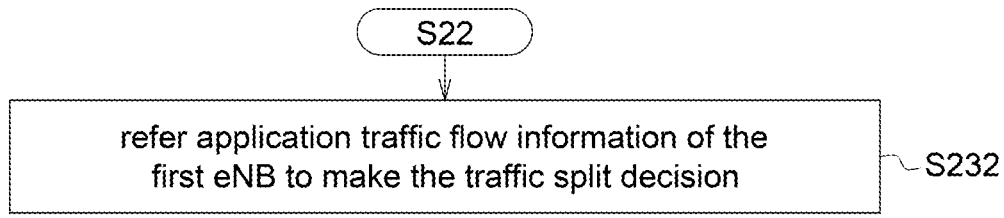
FIG. 2C is a flow chart of a traffic dispatch method of the first eNB 102 according to an exemplary embodiment of the present disclosure.

At step S23, the first 102 eNB makes a traffic split decision according to the estimation result ER and the status report SR of the second eNB 104 to dispatch traffic to the second eNB 104 through the backhaul connection BH. Specifically, the split decision module 204 of the first eNB 102 may make traffic split decision according to the estimation result ER and the status reports SR to dispatch traffic to the second eNB 104 through the backhaul connection BH. In addition to the estimation result ER and the status reports SR, as shown in FIG. 2C, the split decision module 204 may further refer application traffic flow information ATF to make the traffic split decision in an embodiment, at step S232.

Figure 2D:
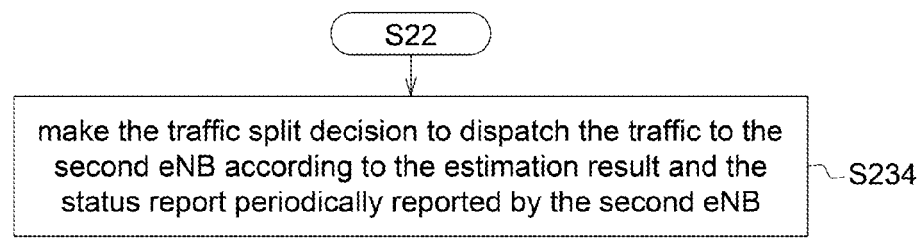
FIG. 2D shows a flow chart of a traffic dispatch method of the first eNB 102 according to an exemplary embodiment of the present disclosure.

In this phase, the network 100 configures the UEs to periodically report their measurement results MR, and then the predict module 202 makes prediction on the data rates of the UEs per resource block (RB). As shown in FIG. 2D, in an embodiment, after step S22 is performed, the first eNB 102 makes the traffic split decision to dispatch the traffic to the second eNB 104 according to the estimation result ER and the status report SR periodically reported by the second eNB 104 at step 234. In an embodiment, the network 100 may configure the UEs to measure and to report to the first eNB 102 or second eNBs 104 by the following rules:

For a type tM UE, it should measure its serving first eNB 102, and periodically report measurement reports MR to the serving first eNB 102.

For a type tMS UE, it should measure its serving first eNB 102 and its serving second eNB 104 and periodically report measurement reports MR to the serving first eNB 104.

For a type tS UE, it should measure its serving second eNB 104 and periodically report measurement reports MR to the serving second eNB 104.

The above configurations may be, in an embodiment, sent by the first eNB 102 to the UEs through LTE-A measurement control messages. After receiving the measurement control messages, the UEs perform measurement procedure as defined in the LTE-A Radio Resource Control (RRC) specification.

Since a type tS UE is only served by the second eNB 104 but not by the first eNB 102, type tS UE only reports its measurement reports MR to its serving second eNB 104 and not to the first eNB 102, the serving second eNB 104 may transfer the measurement reports MR received from the type tS UE to the first eNB 102 to inform the first eNB 102 measurement reports MR of the type tS UE. Accordingly, in some cases, parts of measurement reports MR received by the predict module 202 may be provided by the second eNB 104.

Figure 3:
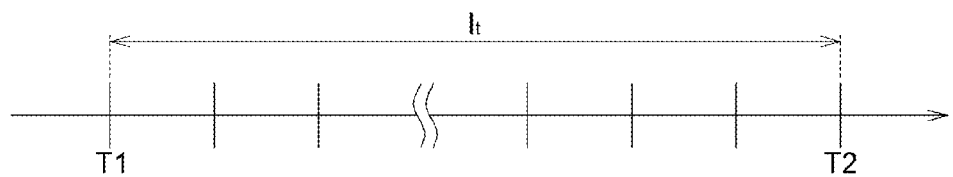
FIG. 3 shows a schematic diagram of a time interval that the predict module determines the output data rates of the UEs.

In this phase, the predict module 202 determines the output data rates of the UEs for a next time interval according to measured channel conditions in the measurement reports MR. As shown in FIG. 3, at time point T1, the predict module 202 determines the output data rates of the UEs for a next time interval IT according to measured channel conditions in the measurement reports MR. At the next time point T2, the predict module 202 may repeat the abovementioned operation to update the output data rates of the UEs. In some applications, the channel conditions to the first eNB 102 are measured by the UEs served by the first eNB 102; while the channel conditions to the second eNB 104 are measured by the UEs served by the second eNB 104. The channel conditions may include channel parameters such as, but not limited to, Signal-to-Noise Ratio (SNR), transmission data rates and channel selectivity of all communication service modes serviced by the corresponding base station, e.g., the first eNB 102 or the second eNB 104. In the following, details of data rate prediction are provided.

For a UE $u_i$ at a time instant, the measurement report MR of the signal quality on the first eNB 102 (resp., second eNB 104) is modeled as $Q^M(u_i)$ (resp., $Q^S(u_i)$). Note that for a type tS UE, say $u_i$, the first eNB 102 may obtain it's $Q^S(u_i)$ from the second eNB 104. Since the wireless signal in time domain is independent, signal trend may be predicted by historical records. So, from the measurement report MR of a UE $u_i$, the predict module 202 predicts the signal quality $Q'(u_i)$ of the UE $u_i$ of the first eNB 102 or the second eNB 104 for the next time interval by one of the following strategies for example.

1) Moving average: the predicted signal quality $Q'(u_i)$ is the moving average of the received signal quality $Q^M(u_i)$ or $Q^S(u_i)$ during the previous time intervals. More specifically, assume that $avg(Q^M(u_i))$ is the average quality values for the previous time interval and the $Q^{M'}(u_i)$ is the last prediction value, the predicted signal quality $Q'(u_i)$ of the first eNB 102 for the next time interval may be obtained by $Q'(u_i)=\alpha \times avg(Q^M(u_i))+(1-\alpha) \times Q^{M'}(u_i)$, where $\alpha$ ($0 \leq \alpha \leq 1$) is a predefined parameter.

2) Exponential moving average: this scheme works similar as the moving average strategy but the setting of $\alpha$ may be modeled as an exponential function.

3) Window based average: unlike the moving average scheme, which refers all historical records to infer the predicted signal quality $Q'(u_i)$, only a predefined constant value W is referred in previous time intervals to calculate the $Q'(u_i)$ value in this scheme.

For a UE $u_i$, the predicted signal quality $Q'(u_i)$ may be translated by a function F(.) to the maximum allowable data rate $R_o^M(u_i)$ or $R_o^S(u_i)$ per RB, where $R_o^M(u_i)$ is the data rate of the UE $u_i$ to the first eNB 102, and $R_o^S(u_i)$ is the data rate of the UE $u_i$ to the second eNB 104. The function F(.) may be determined by, for example, the Adaptive Modulation and Coding (AMC) algorithms of network operators.

Figure 4:
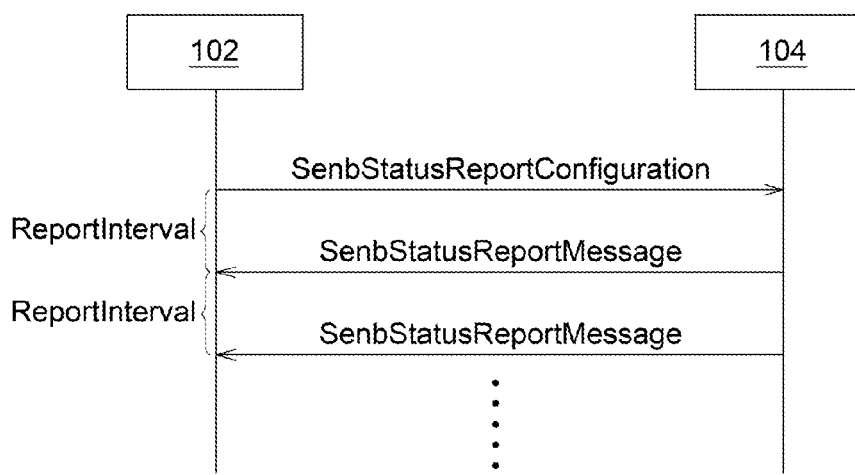
FIG. 4 shows message flows between the first eNB and the second eNB in the periodical traffic dispatch phase.

In this phase, the first eNB 102 configures its second eNBs 104 to periodically report the status report SR comprising such as 1) the buffer status information of tMS and tS UEs and/or 2) the measurement reports MR of the tS UEs. In an embodiment, the second eNB 104 may report channel conditions between the second eNB 104 and the UEs to the first eNB 102 in response to a report configuration message sent by the first eNB 102, wherein the channel conditions are measured by the UEs served by the second eNB 104. As shown in FIG. 4, for the status report module 206, two messages named, SenbStatusReportConfiguration and SenbStatusReportMessage are designed. At beginning, the first eNB 102 configures its second eNBs 104 through the SenbStatusReportConfiguration message. Then, the second eNB 104 sets the corresponding fields in a UE. The SenbStatusReportMessage message is periodically send to the first eNB 102. In the SenbStatusReportMessage, some UEs may need only to report buffer status, some UEs need to provide the measurement results, and other UEs are required to further include their bearer configurations. The detailed operations of the first eNB 102 and the second eNB 104 to deal with these two messages are described below.

Figure 5:
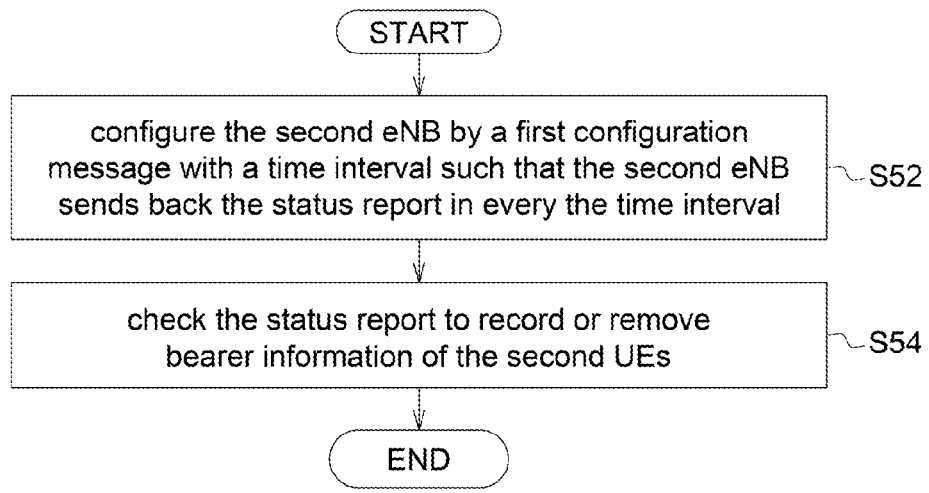
FIG. 5 shows a flow chart of a traffic dispatch method between the the first eNB and the second eNB according to an exemplary embodiment of the present disclosure.

When a second eNB 104 connects to the first eNB 102, the first eNB 102 configures the second eNB 104 by the SenbStatusReportConfiguration message with a time interval, ReportInterval, such that the second eNB 104 sends back a SenbStatusReportMessage as the status report SR in every ReportInterval. When receiving SenbStatusReportMessage from a second eNB 104 with a corresponding identification (ID), SeNBId, the first eNB checks those UEs carried in the messages. (Assume that the first eNB 102 is processing the UE $u_i$ with the corresponding ID, UEID.) If the first eNB 102 finds that the UE $u_i$ carries (active flag, bearer, rate) fields, it checks the active flag. When the active flag is enabled, e.g., the active flag=1, the first eNB 102 records the (bearer, rate) information and sets the UE $u_i$ as type tS. Then, the first eNB 102 records the mapping on bearer/UEID/SeNBId. When active flag is disabled, e.g., the active flag=0, the first eNB 102 removes the bearer's information from its recorded mapping of bearer/UEID/SeNBId. If the field MeasurementResult exists, the first eNB 102 records the measurement results of the UE $u_i$. And then the first eNB 102 utilizes the predict module 202 to infer the output rates of those UEs on the second eNB 104. After that, the first eNB 102 records the buffer status information of the UE $u_i$. As shown in FIG. 5, at step S52, the first eNB 102 configures the second eNB 104 by a first configuration message with a time interval such that the second eNB 104 sends back the status report SR in every the time interval. Then, at step S54, the first eNB 102 records or removes the bearer information of the tS UEs by checking the status report SR.

On the other hand, when receiving the SenbStatusReportConfiguration message, the second eNB 104 sets a timer with length ReportInterval to periodically report the SenbStatusReportMessage to the first eNB 102. When the timer expires, the second eNB 104 checks those UEs that are connected to it.

In an exemplary embodiment, the SenbStatusReportMessage may comprise a 3-tuple field, a MeasurementResult field and a bufferStatus field. If the UE $u_i$ is as type tS and its bearer changes, the second eNB 104 may determine a new bearer is added or a bearer was removed. If the UE $u_i$ has a new bearer, the second eNB 104 sets the 3-tuple as (active flag=1, bearer's ID, bearer's rate). If a bearer of the UE $u_i$ was removed, the second eNB 104 sets the 3-tuple as (active flag=0, bearer's ID, 0).

If the UE $u_i$ is type tS, the second eNB 104 may fill the MeasurementResult field by the average signal quality reported by the UE $u_i$ during the time interval, ReportInterval, using one of the above-mentioned strategies such as the moving average strategy, the exponential moving average strategy and the window based average strategy. Additionally, the second eNB 104 may fill the bufferStatus field by summing all of the remaining data volumes of those bearers that belongs to the UE $u_i$.

Referring FIG. 2A again, the split decision module 204 utilizes the estimation result ER of the UEs and the status report SR provided by the second eNB 104 to make split decision. When a UE is as type tM or type tS, the network 100 may follows the procedures of the LTE-A specification to configure bearers. Specifically, to configure a tMS type UE, the network 100 configures the UE to connect to the first eNB 102 and a slave second eNB 104 at the same time by the procedures in LTE-A specification. The first eNB 102 may sends a reconfiguration message including an information element (IE) to the type tMS UE to inform the type tMS UE a corresponding bearer is split or not. This IE may be attached in the LTE-A rrcConnectionReconfiguration message when configuring a bearer of a UE.

Figure 6:
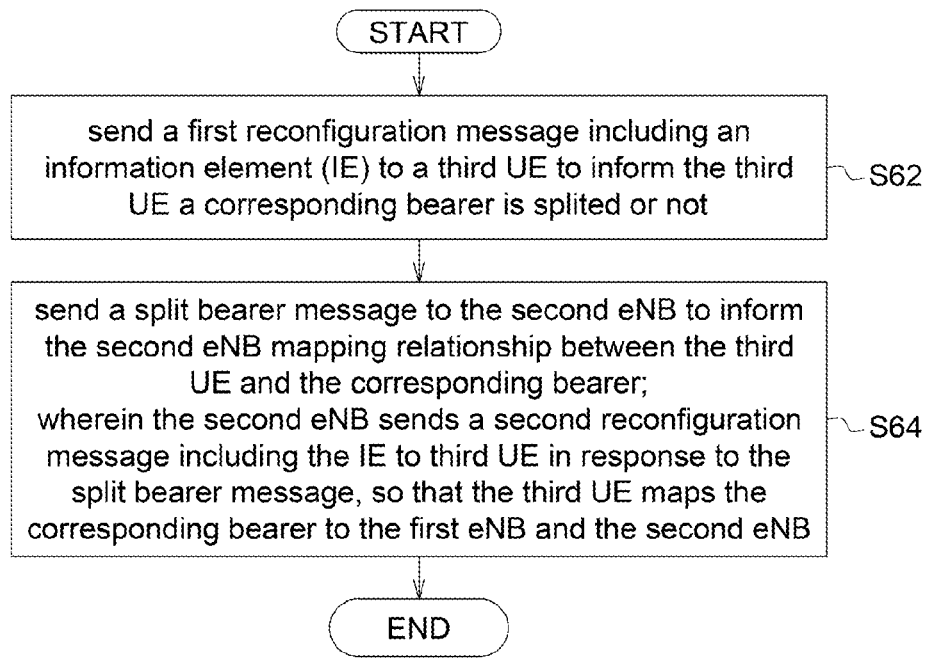
FIG. 6 shows a flow chart of a traffic dispatch method between the first eNB and second eNB according to an exemplary embodiment of the present disclosure.
Figure 7:
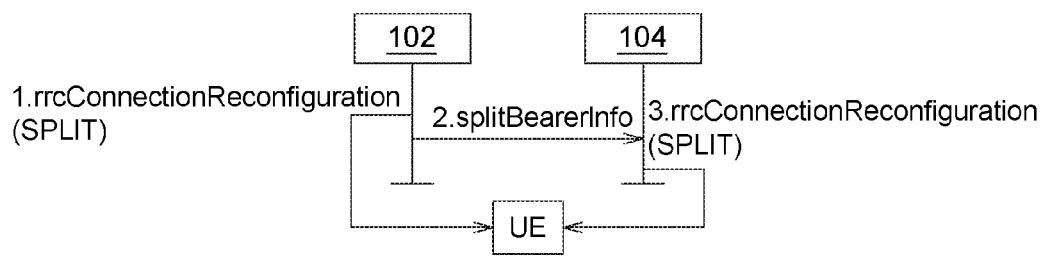
FIG. 7 shows message flows between the first eNB and the second eNB for configuring a split bearer for a type tMS UE.

Referring to FIGS. 6 and 7, FIG. 6 shows a flow chart of a traffic dispatch method between the first eNB 102 and second eNB 104 according to an exemplary embodiment of the present disclosure. FIG. 7 shows message flows between the first eNB 102 and the second eNB 104 for configuring a split bearer for a type tMS UE. At step S62, the first eNB 102 sends a first reconfiguration message including an information element (IE) to a third UE to inform the third UE a corresponding bearer is split or not, wherein the at least one third UE serves by the second eNB 104 and first eNB 102 (i.e., tMS UE). At step S64, the first eNB 102 sends a split bearer message to the second eNB 104 to inform the second eNB 104 mapping relationship between the third UE and the corresponding bearer; wherein the second eNB 104 sends a second reconfiguration message including the IE to third UE in response to the split bearer message, so that the third UE maps the corresponding bearer to the first eNB and the second eNB.

As shown in FIG. 7, the first eNB 102 sends a split bearer message (i.e., the splitBearerinfo message) to the second eNB 104 to inform the second eNB 104 the mapping relationship between the UE and the corresponding bearer. In response to the split bearer message, the second eNB 104 sends a reconfiguration message (i.e., the rrcConnectionReconfiguration message) including the additional IE to the UE, so that the UE maps the corresponding bearer to the first eNB 102 and the second eNB 104.

In FIG. 7, the first eNB 102 first sends an rrcConnectionReconfiguration message containing the additional IE, say SPLIT IE, on the corresponding bearer field to the UE. When the UE receives the rrcConnectionReconfiguration message on the corresponding bearer field from the first eNB 102, the UE expects that it will receive another rrcConnectionReconfiguration message from the second eNB 104. Then, the first eNB 102 sends a splitBearerinfo message to the second eNB 104 containing the mapping between the UEID and the bearer ID. When receiving the splitBearerinfo message, the second eNB 104 sends a corresponding rrcConnectionReconfiguration message containing the SPLIT IE on the corresponding bearer field to the UE. When the UE receives the rrcConnectionReconfiguration message from the second eNB 104, the UE records the split bearer's mapping relationships <UEID/Bearer/SeNBId> in its local database. After the above configurations, the split decision module 204 may start to work based on some network parameters and the reported values from the other two modules.

Figure 8:
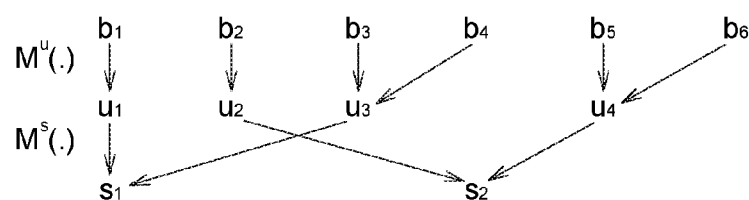
FIG. 8 shows an example of the mapping relationship between the bearers, UEs and the second eNBs.

FIG. 8 shows an example of the mapping relationship between the bearers, UEs and the second eNBs 104. In this example, there are plural bearers labeled as B=$b_1$, $b_2$, ..., $b_n$, plural UEs labeled as U=$u_1$, $u_2$, ..., $u_m$, and plural second eNBs 104 labeled as S=$s_1$, $s_2$, ..., $s_k$. According to the mapping relationship $M^U(.)$ between the bearers and the UEs, the bearers $b_1$ and $b_2$ are respectively assigned to the UEs $u_1$ and $u_2$, the bearers $b_3$ and $b_4$ are assigned to the UE $u_3$, and the bearers $b_5$ and $b_6$ are assigned to the UE $u_4$. According to the mapping relationship $M^S(.)$ between the UEs and the second eNBs 104, the UEs $u_1$ and $u_3$ are served by the second eNB $s_1$, and the UEs $u_2$ and $u_4$ are served by the second eNB $s_2$.

Figure 9:
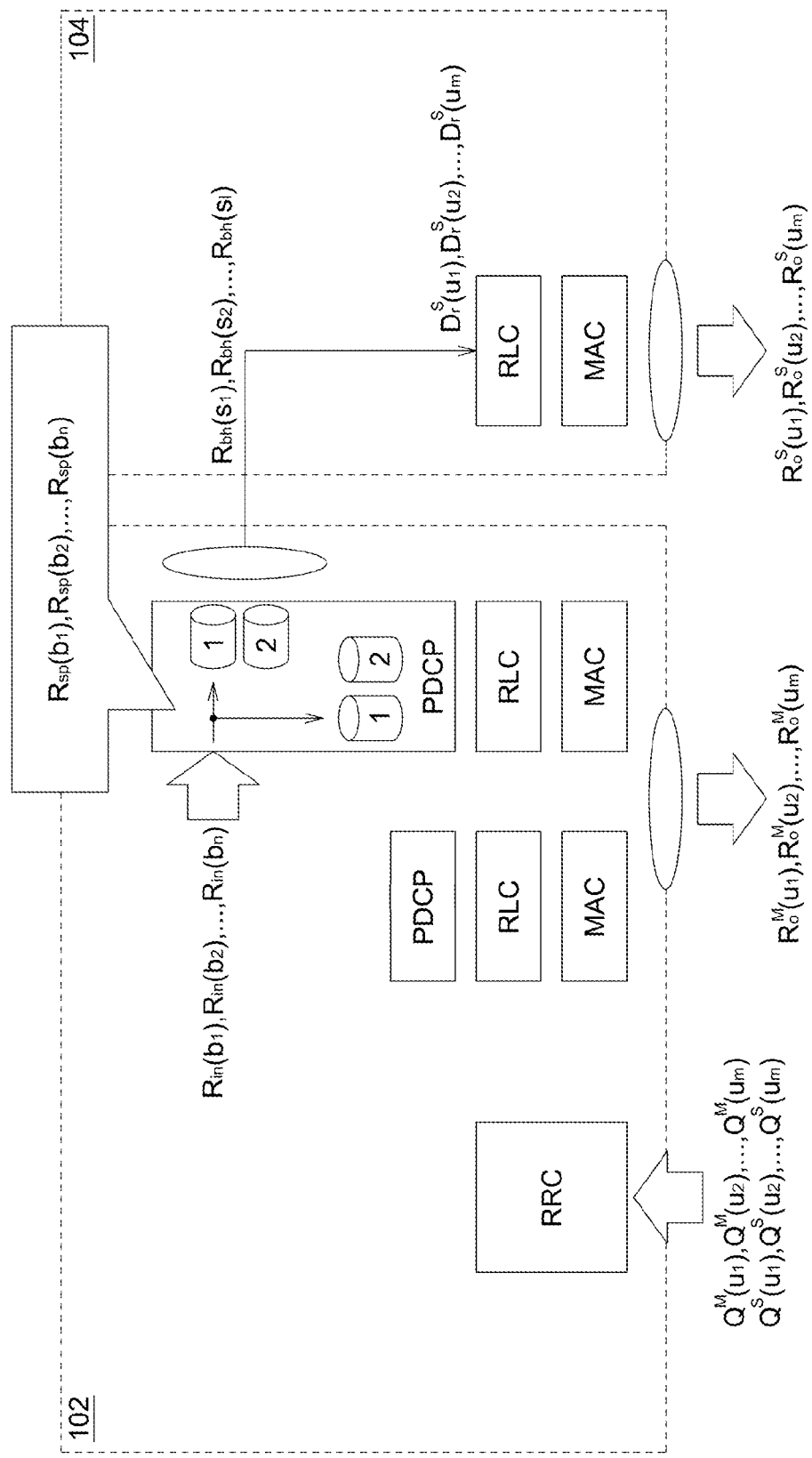
FIG. 9 shows a schematic diagram illustrating the traffic split scheme of the first eNB and second eNB according to an exemplary embodiment of the present disclosure.

FIG. 9 shows a schematic diagram illustrating the traffic split scheme of the first eNB 102 and second eNB 104 according to an exemplary embodiment of the present disclosure. In the example of FIG. 9, the first eNB 102 and second eNB 104 are modeled according to 3GPP standard meeting and having RRC layer, PDCP layer, RLC layer and Media Access Control (MAC) layer.

At beginning, the first eNB 102 gathers the information reported from the second eNB 104 (e.g., including signal quality for each type tS UE, and remaining data located at the second eNB 104 for each type tS and type tMS UE). The RRC layer of the first eNB 102 gathers the measurement reports MR of the UEs. After gathering measurement reports MR, the first eNB 102 may use the predict module 202 to obtain the output data rate $R_o^M(u_i)$ or $R_o^S(u_i)$ for all UEs, and then report to the PDCP layer. The split decision module 204 located at the PDCP layer may refer application traffic flow information, for example, may utilize parameters such as $R_{in}(b_1)$, $R_{in}(b_2)$, ..., $R_{in}(b_n)$ and the $R_{bh}(s_1)$, $R_{bh}(s_2)$, ..., $R_{bh}(s_n)$ to make the traffic split decision, i.e., to calculate split data rate $R_{sp}(b_1)$, $R_{sp}(b_2)$, ..., $R_{sp}(b_n)$, where $R_{in}(b_1)$, $R_{in}(b_2)$, ..., $R_{in}(b_n)$ are parameters of application layer traffic flow such as input data rates of each bearer, and $R_{bh}(s_1)$, $R_{bh}(s_2)$ ..., $R_{bh}(s_n)$ are backhaul data rates from the first eNB 102 to each second eNB 104 labeled as S=$s_1$, $s_2$, ..., $s_n$.

Figure 10:
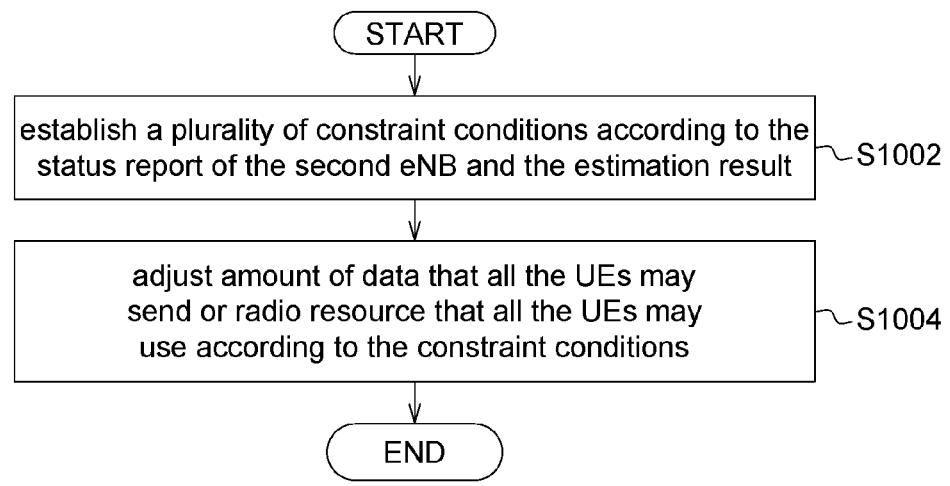
FIG. 10 shows a flow chart of a traffic dispatch method between the first eNB and second eNB according to an exemplary embodiment of the present disclosure.

The split decision module 204 may use a plurality of constraint conditions to adjust amount of data that all the UEs may send or radio resource (e.g., channel bandwidth/transmission data rate) that all the UEs may use. The constraint conditions are established according to the estimation result ER and status report SR of the second eNB 104. As shown in FIG. 10, at step S1002, a plurality of constraint conditions are established according to the status report SR of the second eNB 104 and the estimation result ER. Then, at step S1004, the first eNB 102 adjusts the amount of data that all the UEs may send or radio resource that all the UEs may use according to the constraint conditions. In some applications, the split decision module 204 may use the constraint conditions to maximize total amount of data that all the UEs may send. The constraint conditions may be expressed as follows:

Goal: max $\Sigma_{\forall u_i \in U} D^M(u_i) + D^S(u_i)$

1) For all bearers $b_j \in B^{tMS}$, $R_{sp}(b_j)$, $R_{sp}(b_j) \leq R_{in}(b_j)$;
2) For all UEs $u_i \in U$, $D^M(u_i) \leq R_a^M(u_i) \times I_t + D_r^M(u_i)$ and $D^S(u_i) \leq R_a^S(u_i) \times I_t + D_r^S(u_i)$;
3) For each second eNB $s_k \in S$, $\Sigma_{\forall b_j \in B^{tMS}} \{R_{sp}(b_j) | M^S(M^u(b_j)) = s_k\} \leq R_{bh}(s_k)$;

4) For the first eNB, $\Sigma_{\forall u_i \in U} RB^M(u_i) \leq RB_{max}^M$;
5) For each second eNB $s_k \in S$, $\Sigma_{\forall u_i \in U} \{RB^S(u_i) | M^S(u_i) = s_k\} \leq RB_{max}^M(s_k)$.

Under the constraint conditions 1~5, the objective function tries to maximize the total amount of data that all the UEs may send (through the first eNB 102 and second eNBs 104) so that the network throughput may be maximized. In the constraint condition 1, the model restricts that the for each bearer $b_j$ belongs to bearers set $B^{tMS}$ assigned to the type tMS UEs, the split data rate $R_{sp}(b_j)$ should be less than the input data rate $R_{in}(b_j)$ of the bearer $b_j$. In the constraint condition 2, it is demanded that the calculated output data rate $D^M(u_i)$ and $D^S(u_i)$ may not be larger than the input data volume of the UE at first eNB 102, i.e., $R_a^M(u_i) \times I_t$ (resp., at second eNB 104, i.e., $R_a^S(u_i) \times I_t$) plus the remaining data located at first eNB 102, i.e., $D_r^M(u_i)$ (resp, second eNB 104, i.e., $D_r^S(u_i)$), where $D^M(u_i)$ and $D^S(u_i)$ represent that the total amount of data that $u_i$ may send during the interval $I_t$. In the constraint condition 3, for those split bearers that has to send to a second eNB $s_k$, the total amount of split rates should not be larger than the backhaul capacity of the second eNB $s_k$ ($R_{bh}(s_k)$). In the constraint condition 4, the amount of RBs assigned to those UEs (that are located at first eNB 102) should not be larger than the maximum amount of RBs in the first eNB 102 (i.e., $RB_{max}^M$). The constraint condition 5 is similar to the constraint condition 4. In constraint condition 5, it is demand that the amount of RBs assigned to the UE (served by the second eNB $s_k$) should not be larger than $RB_{max}^M(s_k)$. By the above model, the optimal solution and the results of $R_{sp}(b_1)$, $R_{sp}(b_2)$, ..., $R_{sp}(b_n)$ and $RB^M(u_1)$, $RB^M(u_2)$, ..., $RB^M(u_m)$, $RB^S(u_1)$, $RB^S(u_2)$, ..., $RB^S(u_m)$ may be obtained by any linear programming solver.

Figure 11:
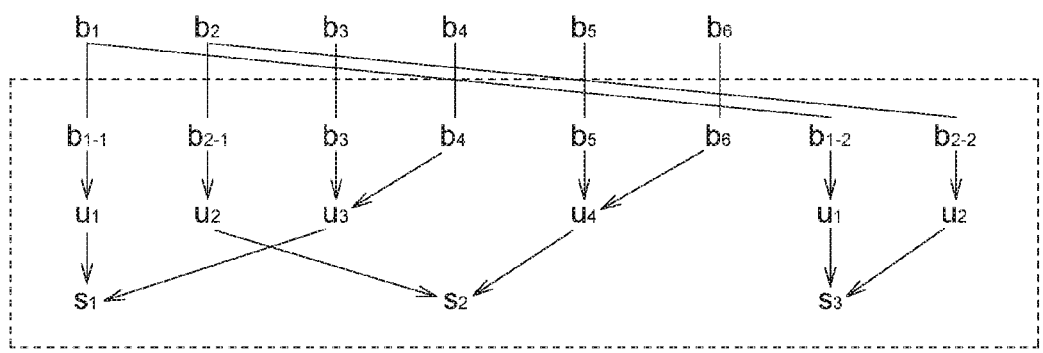
FIG. 11 shows an example of the mapping relationship between the bearers, UEs and the second eNBs.

In an example, the above model may be extended to support split bearers to multiple second eNBs 104. In this scenario, a UE may receive signals from more than two eNBs at the same time. In an embodiment, in FIG. 11, the bearer $b_1$ and $b_2$ are configured to split on second eNB $s_1$ and $s_3$ (resp. $s_2$ and $s_3$). In this case, the bearer $b_1$ and $b_2$ may be further divided into ($b_{1-1}$, $b_{1-2}$) and ($b_{2-1}$, $b_{2-2}$). The above scheme may also be applied to calculate the dispatch decision.

Real-Time Traffic Processing Phase

Figure 12:
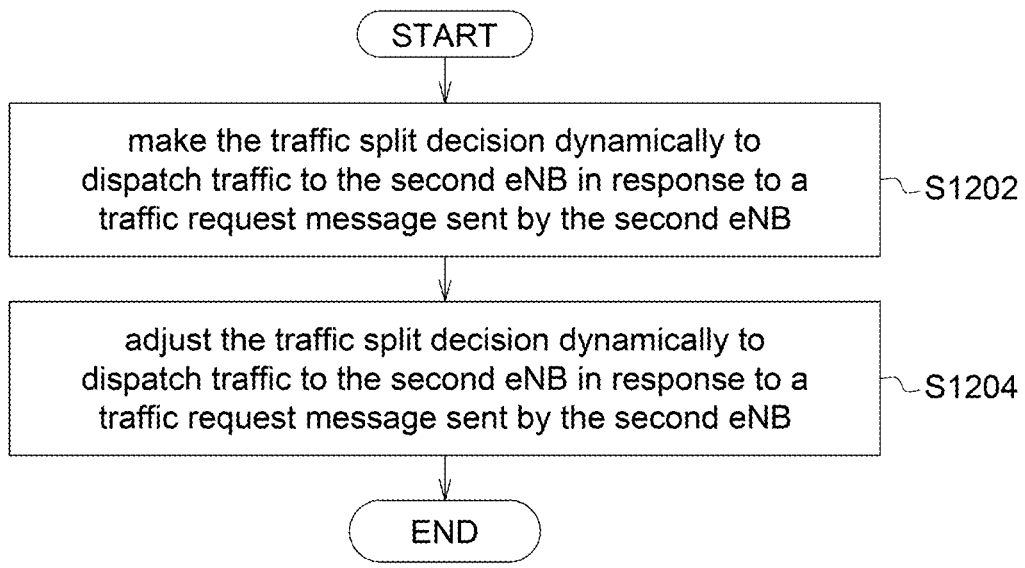
FIG. 12 shows a flow chart of a traffic dispatch method for real-time traffic processing phase according to an exemplary embodiment of the present disclosure.

In this phase, the first eNB 102 dynamically dispatches traffic to the second eNB 104 in response to a traffic request message sent by the second eNB 10. As shown in FIG. 12, at step 1202, the first eNB 102 makes the traffic split decision dynamically to dispatch traffic to the second eNB 104 in response to a traffic request message sent by the second eNB 104. At step 1204, the first eNB 102 adjusts the traffic split decision dynamically to dispatch traffic to the second eNB 104 in response to the traffic request message sent by the second eNB 104. Specifically, after making periodical traffic dispatch decision, the first eNB 102 dispatches data on split bearer according to $R_{sp}(b_j)$, for all $b_j \in B^{tMS}$. When the system is running, the network traffic flows arrive at the first eNB 102 in a packet by packet fashion. The first eNB 102 first relays packets of bearer $b_j$ to the second eNB 104 to satisfy the requirement on $R_{sp}(b_j)$. When there comes a packet for a split bearer $b_j$, the first eNB 102 first checks if the rate $R_{sp}(b_j)$ is satisfied. If not, the first eNB 102 relays the packet to the second eNB 104. Otherwise, the first eNB 102 handles this packet by itself.

Figure 13:
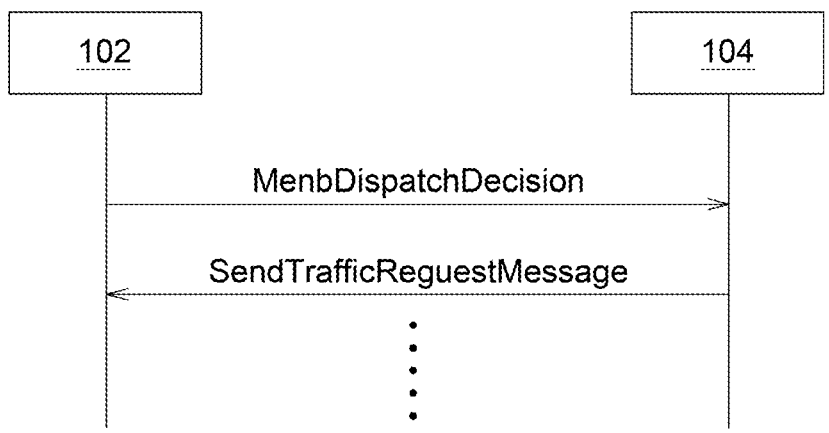
FIG. 13 shows message flows between the first eNB and the second eNB in the real-time traffic processing phase.

In some cases, the packets for split bearers may not arrive in the first eNB 102 smoothly. And, the observed signal quality of the UEs to the second eNB 104 may be varied. In order to preserve the network throughput, some type tMS UEs may request more data from the first eNB 102 or request to slow down split data rates in this phase. As shown in FIG. 13, two messages MenbDispatchDecision and SenbTrafficRequestMessage are designed to exchange the dispatch decision and the traffic request messages. Specifically, after making dispatch decision, the first eNB 102 prepares the MenbDispatchDecision messages to the second eNBs 104 by filling its split decisions on bearers. After running for a while, the second eNB 104 sends the SenbTrafficRequestMessage message to the first eNB 102 to request more data on split bearers if it finds that it has more capacity to serve more data or to request slow down traffic flows.

For a second eNB 104 labeled as $s_k$, the first eNB 102 finds those tMS UEs that are mapping to the second eNB $s_k$. For those UE in the second eNB $s_k$, the first eNB 102 then finds those split bearers of the UE and fill the decided split rates in the field of the MenbDispatchDecision message. Then the first eNB 102 further attaches the $R_o^S(u_i)$ value to the MenbDispatchDecision message.

When the first eNB 102 receives the SenbTrafficRequestMessage message and realizes that a UE on second eNB $s_k$ is hungry, the first eNB 102 may slowly increase the split rate on the bearer $b_j$ (where $M^U(b_j) = u_i$) under the constraint that the increased rates may not exceed the bottleneck $R_{bh}(s_k)$. When the first eNB 102 receives a message of SenbTrafficRequestMessage and realizes that a UE $u_i$ on the second eNB $s_k$ is full, the first eNB 102 may check the signal quality of the $u_i$ at the first eNB 102. If the signal quality of $u_i$ is better than expected, the first eNB 102 may relay less data to the second eNB $s_k$.

On the other hand, when the second eNB $s_k$ receives the MenbDispatchDecision message, it will try to schedule the traffics on corresponding bearers recorded in the message. For a type tMS UE $u_i$, the second eNB $s_k$ may know the expected RBs ($RB^S(u_i)$) that the UE $u_i$ may use and the data incoming rate for all of the bearers (e.g., $R_{sp}(b_x)$, $R_{sp}(b_y)$, ... ). When processing traffic for the UE $u_i$, the second eNB $s_k$ may observe that the UE $u_i$ may send 1) the same amount as expected, 2) more than expected, and 3) less than expected by the recorded $R_o^S(u_i)$.

In an example, the second eNB $s_k$ may determine the UE's status by the following three tables (Table 1~3):

TABLE 1

| The UE may send as the same amount as expected | | |
|---|---|---|
| | Too less traffic on split bearers | Traffic on split bearers as expected |
| Too less traffic on non-split bearers | May request more data from first eNB | May request more data from first eNB |
| Traffic on non-split bearers as expected | May request more data from first eNB | As expected |
| Too more traffic on non-split bearers | Undecidable | Undecidable |

TABLE 2

The UE may send more than as expected

|  | Too less traffic on split bearers | Traffic on split bearers as expected |
| --- | --- | --- |
| Too less traffic on non-split bearers | May request more data from first eNB | May request more data from first eNB |
| Traffic on non-split bearers as expected | May request more data from first eNB | May request more data from first eNB |
| Too more traffic on non-split bearers | Undecidable | Undecidable |

TABLE 3

The UE may send less than as expected

|  | Too less traffic on split bearers | Traffic on split bearers as expected |
| --- | --- | --- |
| Too less traffic on non-split bearers | Undecidable | Undecidable |
| Traffic on non-split bearers as expected | Undecidable | Need to request to slow down |
| Too more traffic on non-split bearers | Undecidable | Need to request to slow down |

In short, when the second eNB $s_k$ determines that the UE may request more data from the first eNB 102, the second eNB $s_k$ will set the UE to be hungry. When the second eNB $s_k$ determines that UE needs to request to slow down, the second eNB $s_k$ will set the UE to be full. After a short period of time, the second eNB $s_k$ may collect those UEs that are hungry or full, and then send the SenbTrafficRequestMessage message to the first eNB 102.

Based on the above, a data dispatch scheme is provided and is applied to a network including a first eNB and second eNB(s). According to various exemplary embodiments of the present disclosure, the first eNB may make optimal traffic split decision to offload traffics to the second eNB(s) based on measurement reports of UEs and status report of the second eNB(s), and hence the network throughput may be maximized.

It will be clear to those skilled in the art that various modifications and variations could be made to the disclosed exemplary embodiments. It is intended that the specification and examples be considered as exemplary only, with a true scope of the disclosure being indicated by the following claims and their equivalents.

What is claimed is:

1. A traffic dispatch method of an evolved NodeB (eNB) in a network, wherein the eNB is a first eNB which connected to a second evolved NodeB (eNB) through a backhaul connection and coverage area of the second eNB is encompassed by the first eNB, the traffic dispatch method comprises:
 outputting an estimation result of output data rates of a plurality of user equipments (UEs), by the first eNB, according to measurement reports of the plurality of user equipments (UEs), wherein the measurement reports include measured channel conditions, parts of the measurement reports are provided by the second eNB and parts of the measurement reports are provided by parts of the UEs; and making a traffic split decision, by the first eNB, according to the estimation result and a status report sent periodically with a time interval from the second eNB in response to a report configuration message sent by the first eNB, to dispatch traffic to the second eNB through the backhaul connection,
 wherein the plurality of UEs include one or more first UEs, and the status report comprises the measurement reports of the one or more first UEs and/or buffer status information indicating data associated with at least one of the first UEs remaining in the second eNB, the one or more first UEs being type-tS UEs that are configured to be served by the second eNB.

2. The traffic dispatch method according to claim 1, wherein the first eNB determines output data rates of the UEs for a next time interval according to the measured channel conditions in the measurement reports.

3. The traffic dispatch method according to claim 1, further comprising:
 checking the status report to record or remove bearer information of the first UEs, by the first eNB.

4. The traffic dispatch method according to claim 1, wherein the UEs includes at least one third UE served by both the second eNB and first eNB, the traffic dispatch method further comprises:
 sending, by the first eNB, a first reconfiguration message including an information element (IE) to the third UE to inform the third UE a corresponding bearer is split or not.

5. The traffic dispatch method according to claim 4, further comprising:
 sending, by the first eNB, a split bearer message to the second eNB to inform the second eNB mapping relationship between the third UE and the corresponding bearer;
 wherein in response to the split bearer message, the second eNB sends a second reconfiguration message including the IE to the third UE, so that the third UE maps the corresponding bearer to the first eNB and the second eNB.

6. The traffic dispatch method according to claim 1, wherein the first eNB uses a plurality of constraint conditions, adjusting amount of data that all the UEs may send or radio resource that all the UEs may use, wherein the constraint conditions are established according to the status report of the second eNB and the estimation result.

7. The traffic dispatch method according to claim 1, wherein the first eNB adjusts the traffic split decision dynamically to dispatch traffic to the second eNB in response to a traffic request message sent by the second eNB.

8. The traffic dispatch method according to claim 1, wherein the first eNB makes the traffic split decision dynamically to dispatch traffic to the second eNB in response to a traffic request message sent by the second eNB.

9. The traffic dispatch method according to claim 1, wherein the first eNB refers application traffic flow information to make the traffic split decision.

10. The traffic dispatch method according to claim 1, wherein the first eNB is a macro eNB and the second eNB is a small cell eNB.

11. The traffic dispatch method according to claim 1, further comprising:
 when first eNB connects to the second eNB, the first eNB configures the second eNB by a first configuration message with a time interval such that the second eNB sends back the status report in the time interval.

12. The traffic dispatch method according to claim 11, wherein the first eNB removes or records a bearer information of a UE served by the second eNB by checking the status report.

13. A traffic dispatch method of a first evolved NodeB (eNB) in a network, comprising:
  generating an estimation result of output data rates of a plurality of user equipments (UEs), according to measurement reports of the plurality of user equipments (UEs), wherein the measurement reports include measured channel conditions, parts of the measurement reports are provided by a second eNB connected to the first eNB through a backhaul connection and parts of the measurement reports are provided by parts of the UEs, wherein coverage area of the second eNB is encompassed by the first eNB;
  sending a report configuration message to the second eNB;
  receiving a status report that the second eNB sent in response to the report configuration message periodically with a time interval; and
  making a traffic split decision according to the estimation result and the status report sent from the second eNB to dispatch traffic to the second eNB through the backhaul connection;
  wherein the plurality of UEs include one or more first UEs, and the status report comprises the measurement reports of the one or more first UEs and/or buffer status information indicating data associated with at least one of the first UEs remaining in the second eNB, the one or more first UEs being type-tS UEs that are configured to be served by the second eNB.

14. The traffic dispatch method according to claim 13, wherein the step of generating the estimation result comprises:
  determining output data rates of the UEs for a next time interval according to the measured channel conditions in the measurement reports.

15. The traffic dispatch method according to claim 13, further comprising:
  checking the status report to record or remove bearer information of the first UEs.

16. The traffic dispatch method according to claim 13, wherein the UEs includes at least one third UE served by both the second eNB and first eNB, the traffic dispatch method further comprises:
  sending a first reconfiguration message including an information element (IE) to the third UE to inform the third UE a corresponding bearer is split or not.

17. The traffic dispatch method according to claim 16, further comprising:
  sending a split bearer message to the second eNB to inform the second eNB mapping relationship between the third UE and the corresponding bearer;
  wherein the second eNB sends a second reconfiguration message including the IE to third UE in response to the split bearer message, so that the third UE maps the corresponding bearer to the first eNB and the second eNB.

18. The traffic dispatch method according to claim 13, further comprising:
  adjusting amount of data that all the UEs may send or radio resource that all the UEs may use according to a plurality of constraint conditions, wherein the constraint conditions are established according to the status report of the second eNB and the estimation result.

19. The traffic dispatch method according to claim 13, further comprising:
  adjusting the traffic split decision dynamically to dispatch traffic to the second eNB in response to a traffic request message sent by the second eNB.

20. The traffic dispatch method according to claim 13, further comprising:
  making the traffic split decision dynamically to dispatch traffic to the second eNB in response to a traffic request message sent by the second eNB.

21. The traffic dispatch method according to claim 13, further comprising:
  referring application traffic flow information of the first eNB to make the traffic split decision.

22. The traffic dispatch method according to claim 13, wherein the first eNB is a macro eNB and the second eNB is a small cell eNB.

23. The traffic dispatch method according to claim 13, further comprising:
  configuring the second eNB by a first configuration message with a time interval such that the second eNB sends back the status report in the time interval.

24. The traffic dispatch method according to claim 23, further comprising:
  checking the status report to remove or record a bearer information of a UE served by the second eNB.

25. A traffic dispatch method of an evolved NodeB (eNB) in a network, wherein the eNB is a second eNB which connected to a first eNB through a backhaul connection and serves a plurality of user equipments (UEs), wherein coverage area of the second eNB is encompassed by the first eNB, the traffic dispatch method comprises:
  outputting a status report by the second eNB to the first eNB, in response to a report configuration message sent by the first eNB, so that the first eNB makes a traffic split decision according to the status report of the second eNB, wherein the second eNB sets a timer with a time interval to periodically report the status report,
  wherein the plurality of UEs include one or more first UEs, and the status report comprises the measurement reports of the one or more first UEs and/or buffer status information indicating data associated with at least one of the first UEs remaining in the second eNB, the one or more first UEs being type-tS UEs that are configured to be served by the second eNB, and
  wherein the measurement reports include measured channel conditions.

26. The traffic dispatch method according to claim 25, wherein the second eNB reports channel conditions between the second eNB and the one or more first UEs to the first eNB in response to the report configuration message, wherein the channel conditions are measured by the one or more first UEs.

27. The traffic dispatch method according to claim 25, wherein when the timer expires, the second eNB checks the one or more UEs connecting to it and updates bearer mappings of the one or more UEs.

28. The traffic dispatch method according to claim 25, wherein the second eNB sends a reconfiguration message to one of the one or more UEs in response to a split bearer message receiving from the first eNB, so that the one of the one or more UEs maps a split bearer to the first eNB and the second eNB.

29. The traffic dispatch method according to claim 25, wherein the second eNB sends a traffic request message to the first eNB to request the first eNB to adjust traffic split to the second eNB.

30. The traffic dispatch method according to claim 25, wherein the first eNB is a macro eNB and the second eNB is a small cell eNB.

\* \* \* \* \*